US011563678B1

(12) United States Patent
Udupa et al.

(10) Patent No.: US 11,563,678 B1
(45) Date of Patent: Jan. 24, 2023

(54) ORCHESTRATION OF OVERLAY PATHS FOR WIDE AREA NETWORK VIRTUALIZATION

(71) Applicant: Microsoft Technology Licensing, LLC, Redmond, WA (US)

(72) Inventors: Abhishek Udupa, Bellevue, WA (US); Sharad Agarwal, Seattle, WA (US); Ryan Andrew Beckett, Redmond, WA (US); Rachee Singh, Redmond, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/397,525

(22) Filed: Aug. 9, 2021

(51) Int. Cl.
　　*G06F 13/00* (2006.01)
　　*H04L 45/586* (2022.01)
　　*H04L 45/24* (2022.01)
　　*H04L 45/42* (2022.01)
　　*H04L 45/02* (2022.01)

(52) U.S. Cl.
　　CPC .......... *H04L 45/586* (2013.01); *H04L 45/02* (2013.01); *H04L 45/24* (2013.01); *H04L 45/42* (2013.01)

(58) Field of Classification Search
　　CPC ....... H04L 45/586; H04L 45/02; H04L 45/24; H04L 45/42
　　USPC ........ 709/220–222, 238, 239–244, 224, 223, 709/202
　　See application file for complete search history.

(56) References Cited

U.S. PATENT DOCUMENTS

| 2016/0174081 A1* | 6/2016 | Lau ...................... H04W 24/02 455/457 |
| 2017/0181210 A1 | 6/2017 | Nadella et al. |
| 2020/0028758 A1 | 1/2020 | Toilet et al. |
| 2020/0106696 A1 | 4/2020 | Michael et al. |

(Continued)

FOREIGN PATENT DOCUMENTS

EP　　3716063 A1　　9/2020

OTHER PUBLICATIONS

Dunbar, "Segment Routing for SD-WAN Paths over Hybrid Networks; draft-dunbar-sr-sdwan-over-hybrid-networks-01.txt", In Proceedings of Network Working Group, Internet Engineering Task Force, Jun. 18, 2018, pp. 1-24.

(Continued)

*Primary Examiner* — Kenneth R Coulter
(74) *Attorney, Agent, or Firm* — ArentFox Schiff LLP (57) ABSTRACT

The present application relates to traffic routing for overlay paths in a public cloud network. A path orchestrator receives a configuration of a set of overlay paths for a wide area network virtualization from a client, each overlay path including virtual routing nodes associated with respective geographic regions and at least one policy for a link between the virtual routing nodes. The path orchestrator is configured to instantiate a plurality of virtual routers on computing resources of the public cloud network located within the respective geographic regions based on the configuration, each virtual router configured to route traffic according to the policy for each link associated with the virtual routing node corresponding to the virtual router. The path orchestrator is configured to scale the plurality of virtual routers based on traffic for the client on the set of overlay paths.

20 Claims, 5 Drawing Sheets

(56) References Cited

U.S. PATENT DOCUMENTS

2021/0243053 A1\* 8/2021 Dunbar ............... H04L 12/4675
2022/0000008 A1\* 1/2022 Hubner ................ G05D 1/0278

OTHER PUBLICATIONS

"International Search Report and Written Opinion Issued in PCT Application No. PCT/US22/037056", dated Sep. 30, 2022, 12 Pages.

\* cited by examiner

ORCHESTRATION OF OVERLAY PATHS FOR WIDE AREA NETWORK VIRTUALIZATION

BACKGROUND

Wide area networks may include computing resources spread across a geographic region and connected via communication links such as fiber optic cables. The size of wide area networks may vary greatly from a small city to a global network. For example, a WAN may connect multiple offices of an enterprise, the customers of a regional telecommunications operator, or a global enterprise. The computing resources and connections within a WAN may be owned and controlled by the WAN operator.

The WAN operator may provide a virtual WAN (vWAN) service that allows a client to establish an overlay network on top of the WAN. The overlay network may include virtual network entities or hubs that are associated with geographic regions. Conventionally, cloud service providers do not provide clients with control over how the underlying network allocates resources to provide a requested service. In the case of a vWAN, however, the client may specify services to be performed within designated geographic regions. Accordingly, performance of the network for different geographic regions may be an important metric.

Network performance for a vWAN service may be constrained by available hardware in the underlying network. For example, speed and throughput of the vWAN may be constrained by link capacity and routing capacity of the underlying network. Accordingly, there is a need for orchestration of overlay paths for a WAN virtualization to improve performance of a vWAN service.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, the disclosure provides an apparatus for configuring traffic routing in a public cloud network. The apparatus includes a memory storing computer-executable instructions and at least one processor configured to execute the instructions. The at least one processor is configured to receive a configuration of a set of overlay paths for a wide area network virtualization from a client, each overlay path including virtual routing nodes associated with respective geographic regions and at least one policy for a link between the virtual routing nodes. The at least one processor is configured to instantiate a plurality of virtual routers on computing resources of the public cloud network located within the respective geographic regions based on the configuration, each virtual router configured to route traffic according to the policy for each link associated with the virtual routing node corresponding to the virtual router. The at least one processor is configured to scale the plurality of virtual routers based on traffic for the client on the set of overlay paths.

In some implementations, the virtual routing nodes include ingress points, egress points, virtual hubs, and intermediary nodes.

In some implementations, each of the plurality of virtual routers is configured to process packets without context switches between a kernel space and a user space. For example, each of the plurality of virtual routers may be configured with at least one of data plane development kit (DPDK), xpress transport protocol (XTP), eXpress DataPath (XDP), or another accelerated dataplane framework.

In some implementations, the at least one processor is configured to instantiate the plurality of virtual routers with a tunneling mechanism that encapsulates packets using one or more encapsulation techniques or a port forwarding configuration that maps transport protocol ports on the virtual routing nodes to destination internet addresses.

In some implementations, the plurality of virtual routers provide network path isolation between the client and other clients of the public cloud network.

In some implementations, the plurality of virtual routers includes virtual machines executed on generic processing resources of the computing resources.

In some implementations, the at least one policy for each link between the virtual routing nodes is associated with a service level agreement (SLA).

In some implementations, the at least one policy for each link between the virtual routing nodes includes one or more of a bandwidth policy, a latency policy, or a geographic policy.

In some implementations, the at least one processor is configured to adjust a number of the virtual routers within a range defined by the client.

In some implementations, the at least one processor is configured to receive a request from the client to add or remove a virtual router.

In some implementations, each overlay path is associated with a 5-tuple or discriminated services code point (DSCP) that identifies client traffic for the overlay path.

In some implementations, the configuration of the overlay path includes a routing bandwidth for one or more of the virtual routing nodes or one or more of the links between the virtual routing nodes.

In another aspect, the disclosure provides a method of configuring traffic routing in a public cloud network. The method includes receiving a configuration of a set of overlay paths for a wide area network virtualization from a client, each overlay path including virtual routing nodes associated with respective geographic regions and at least one policy for a link between the virtual routing nodes. The method includes instantiating a plurality of virtual routers on computing resources of the public cloud network located within the respective geographic regions based on the configuration, each virtual router configured to route traffic according to the policy for each link associated with the virtual routing node corresponding to the virtual router. The method includes scaling the plurality of virtual routers based on traffic for the client on the set of overlay paths.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing a virtualized wide area network (vWAN). In an aspect, a vWAN portal allows a client to configure overlay paths between virtual routing nodes in the vWAN. For example, the client may be a network operator for a customer of the vWAN with a client network that is connected to the vWAN. The vWAN portal allows the client to configure the routing nodes representing geographic locations and overlay paths between the routing nodes. In particular, the vWAN portal allows the client to configure policies for the overlay paths. The overlay paths may be a representation of one or more paths through an underlying WAN controlled by the vWAN operator.

A path orchestrator may receive policies from the client regarding the overlay paths. For example, the policies may be associated with a service level agreement (SLA) and specify performance of the vWAN. For example, the policy for an overlay path may include routing bandwidth requirements and/or latency requirements for traffic traveling between virtual routing nodes. The path orchestrator may configure network resources within the underlying WAN to satisfy the requirements of the policies for one or more overlay paths.

In an aspect, the path orchestrator may satisfy policies for overlay paths by instantiating virtual routers on resources of the underlying WAN. In some implementations, the virtual routers may be implemented on generic computing resources of a public cloud network (e.g., servers). The virtual routers may implement an accelerated data plane framework to reduce latency of context switches. The path orchestrator may scale a number of the virtual routers for a client based on traffic for the overlay path. Accordingly, the path orchestrator may configure the underlying WAN to satisfy the policies and/or SLA of the client. The use of virtual routers may improve flexibility of resource allocation, provide network path isolation between clients, and reduce hardware requirements.

Figure 2:
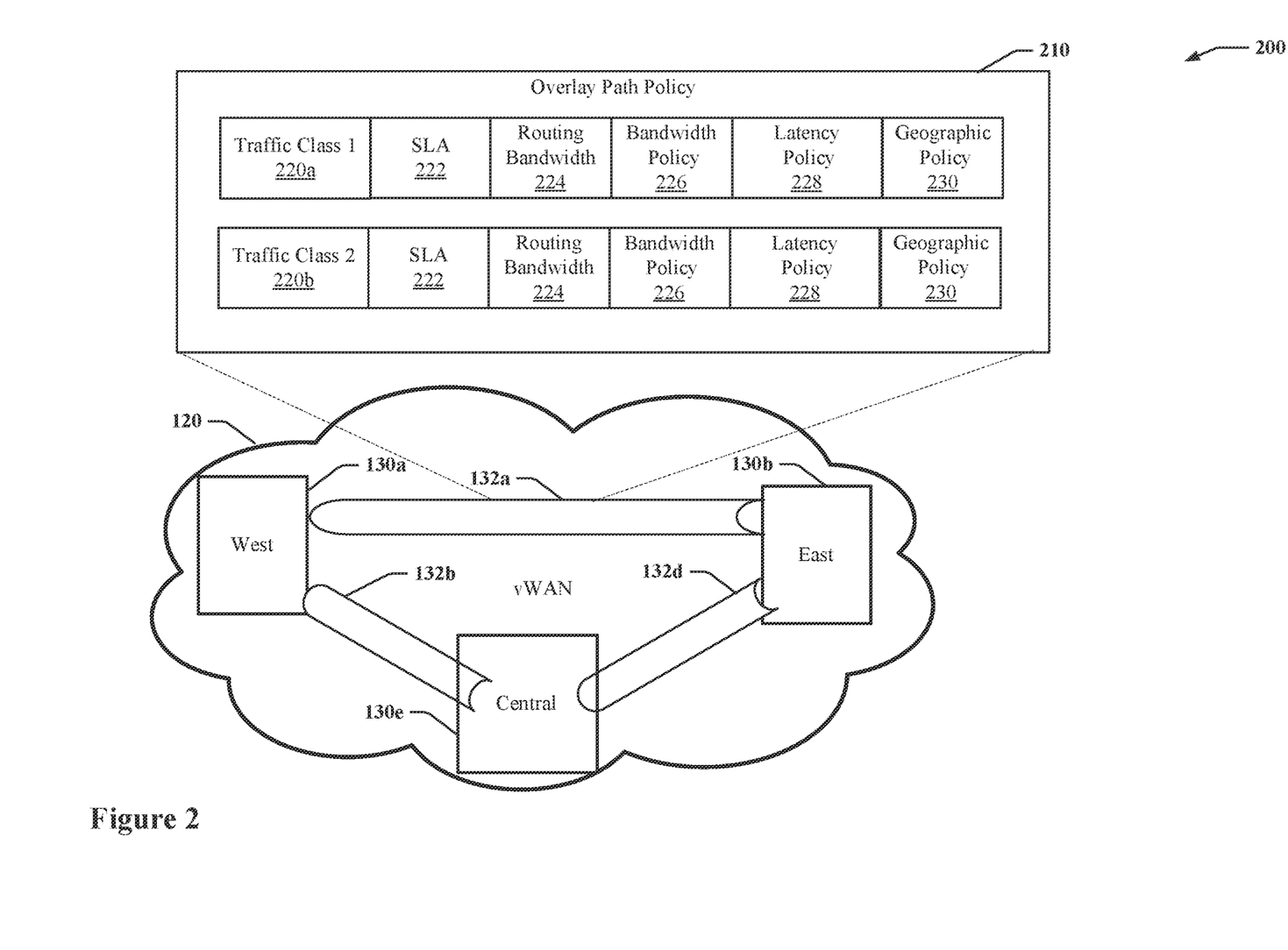
FIG. 2 is a diagram of an example of policies for an overlay path, in accordance with aspects described herein.
Figure 3:
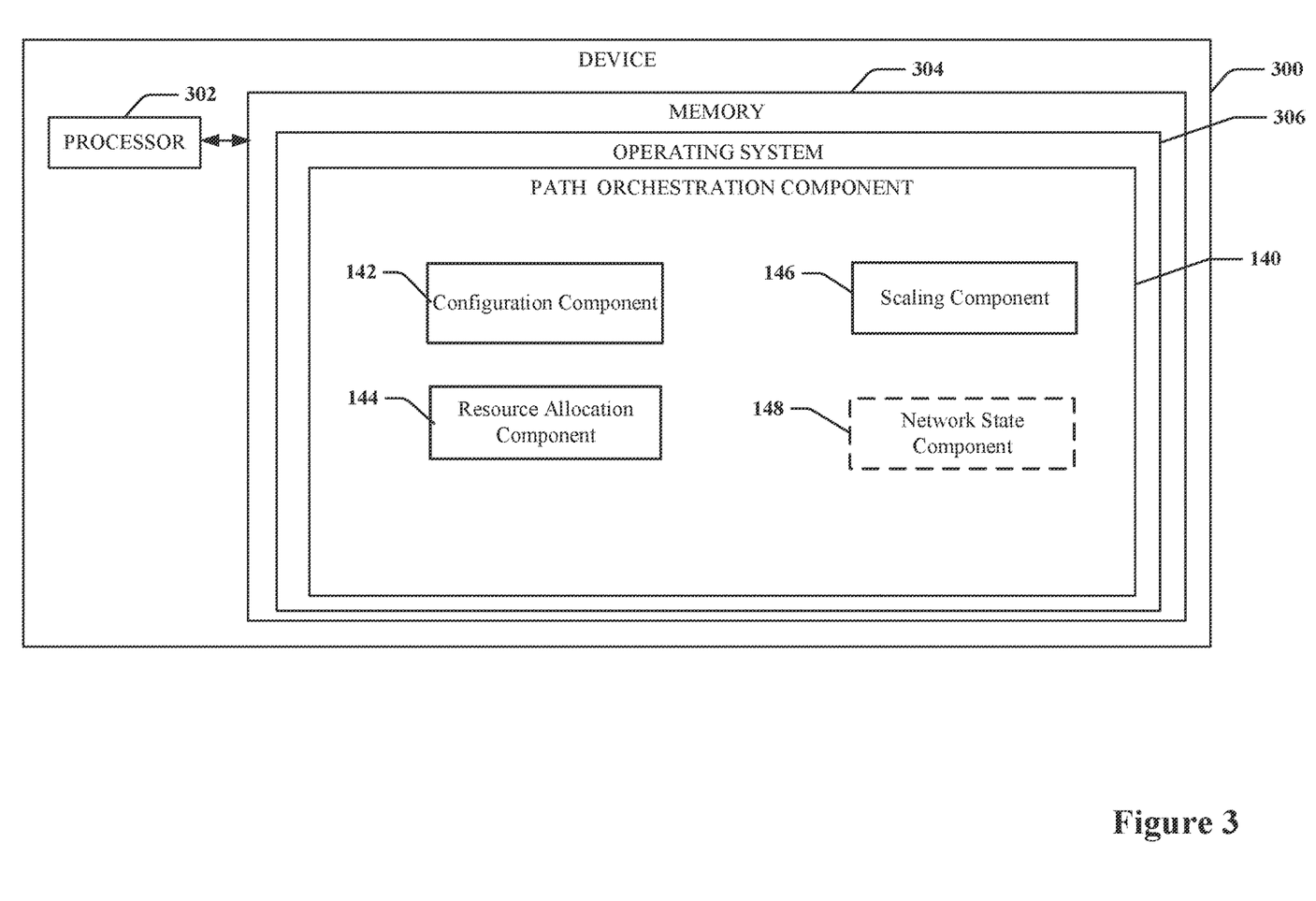
FIG. 3 is a schematic diagram of an example of a device for configuring an underlying network to implement overlay paths of a vWAN, in accordance with aspects described herein.
Figure 4:
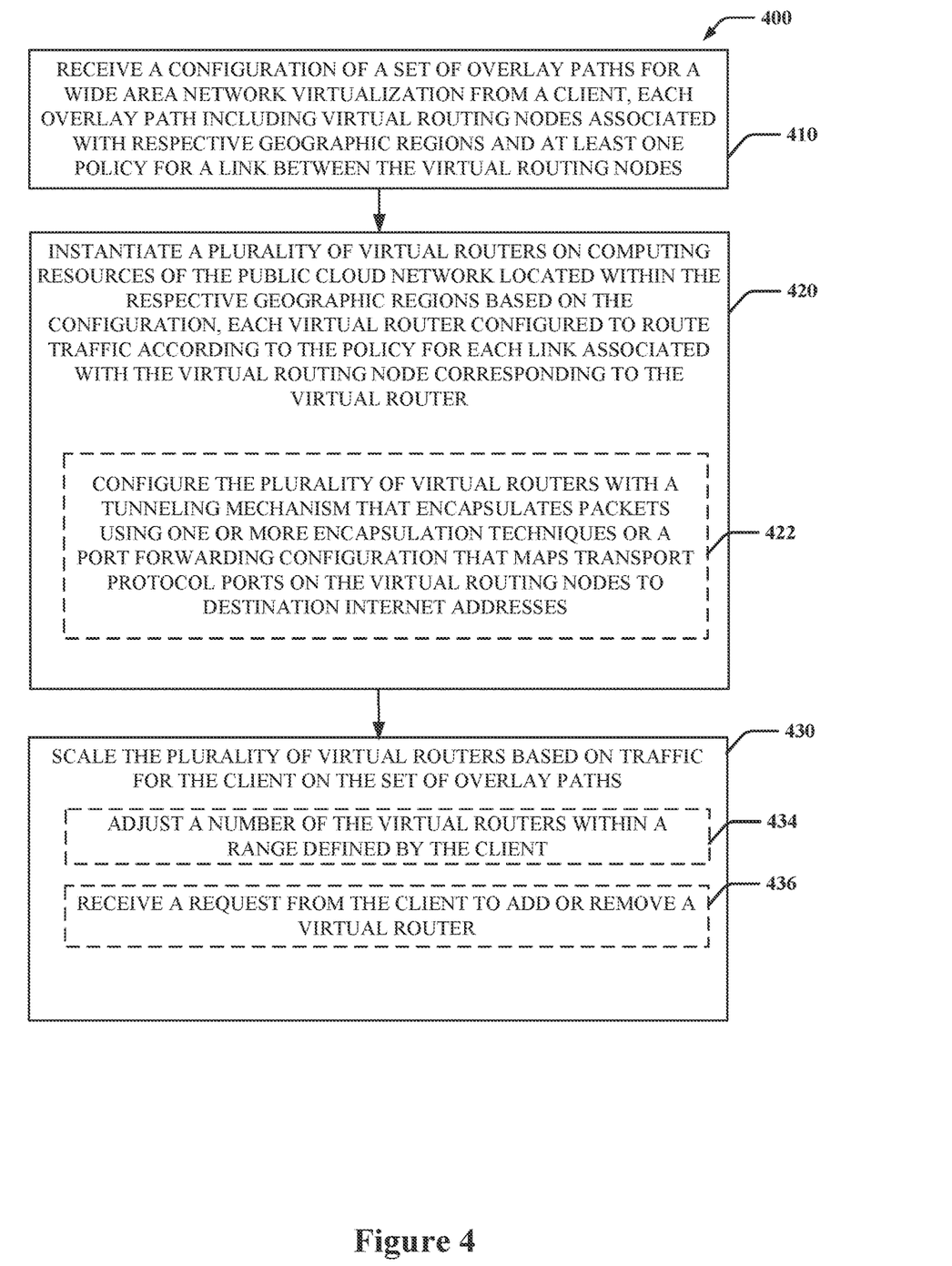
FIG. 4 is a flow diagram of an example of a method of configuring routing for overlay paths, in accordance with aspects described herein.

Turning now to FIGS. 1-5, examples are depicted with reference to one or more components and one or more methods that may perform the actions or operations described herein, where components and/or actions/operations in dashed line may be optional. Although the operations described below in FIG. 4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
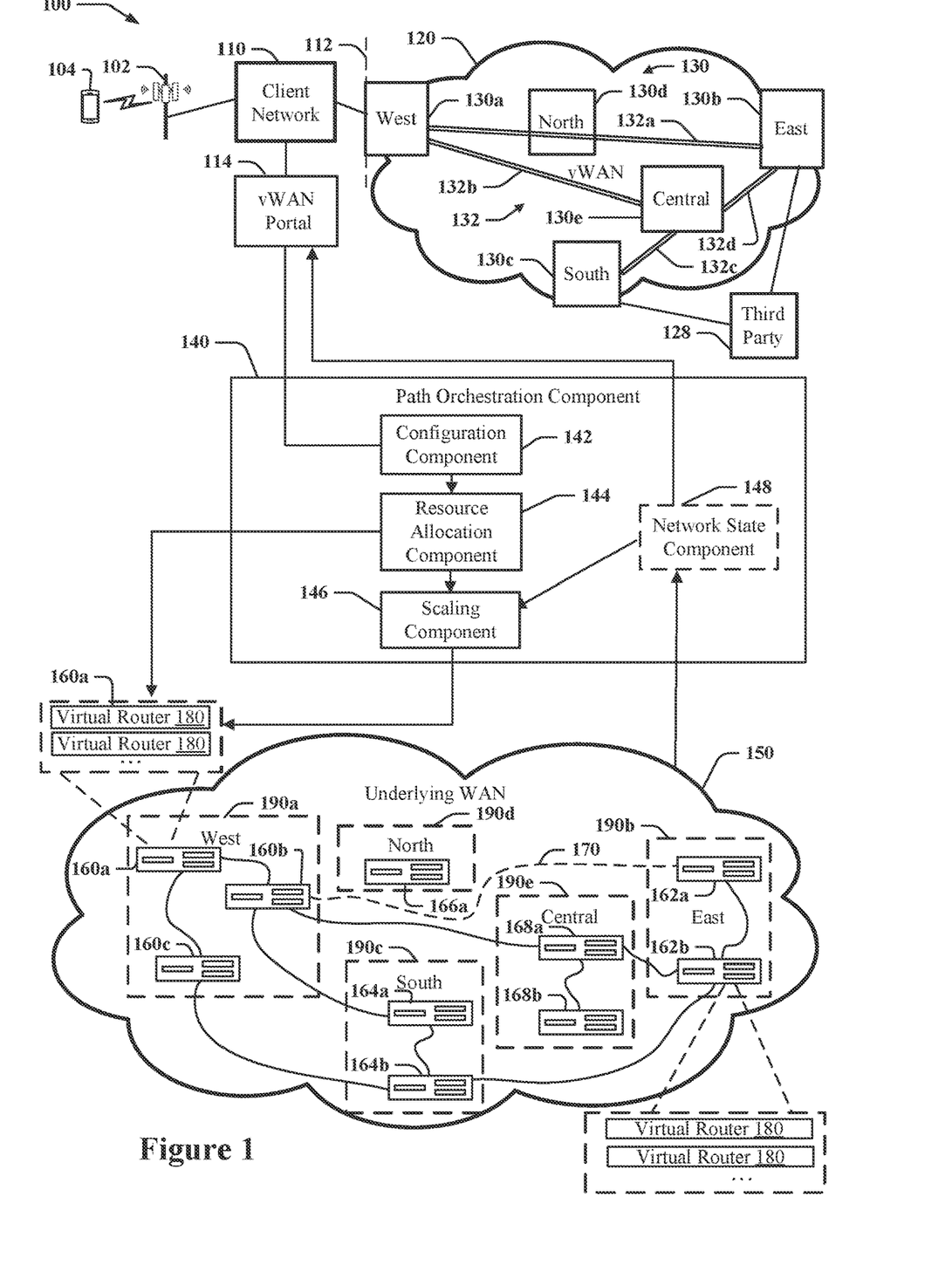
FIG. 1 is a diagram of an example of an architecture for a virtualized wide area network (vWAN) including overlay paths, in accordance with aspects described herein.

FIG. 1 is a conceptual diagram 100 of an example of an architecture for a vWAN 120. The vWAN 120 may be connected to a client network 110. The vWAN 120 may be implemented by an underlying WAN 150. A path orchestration component 140 may configure the underlying WAN 150 to implement overlay paths configured for the vWAN 120.

The path orchestration component 140 may be configured to implement policies for the virtual routing nodes and/or overlay paths in the underlying WAN 150. The path orchestration component 140 may include a configuration component 142 configured to receive a configuration of a set of overlay paths for a wide area network virtualization from a client, each overlay path including virtual routing nodes associated with respective geographic regions and at least one policy for a link between the virtual routing nodes. The path orchestration component 140 may include a resource allocation component 144 configured to instantiate a plurality of virtual routers on computing resources of the public cloud network located within the respective geographic regions based on the configuration. Each virtual router may be configured to route traffic according to the policy for each link associated with the virtual routing node corresponding to the virtual router. The path orchestration component 140 may include a scaling component 146 configured to scale the plurality of virtual routers based on traffic for the client on the set of overlay paths. The path orchestration component 140 may optionally include a network state component 148 configured to measure the traffic for the client on the set of overlay paths. The network state component 148 may provide traffic metrics to the client via a vWAN portal 114.

The client network 110 may be a customer of the vWAN 120. The client network 110 may be, for example, a radio access network (RAN) including a user device 104 and a base station 102. The client network 110 may be connected to the vWAN 120 at a boundary 112 to expand the client network 110. For instance, the vWAN 120 may provide a connection to $3^{rd}$ party services 128 that are hosted on or connected to the vWAN 120, or the vWAN 120 may host services of the client network 110.

In an aspect, the vWAN 120 may include virtual routing nodes 130 (e.g., virtual routing nodes 130a-130e), which may represent a presence in a geographic region. The client network 110 may not have physical resources in a geographic region corresponding to a virtual routing node. In some implementations, the vWAN 120 may include a virtualized radio access network (vRAN). For instance, the vWAN 120 may perform functions of a core network or may include virtualized base stations that perform RAN processing.

A vWAN operator may provide the vWAN portal 114 to a client. For example, the vWAN portal 114 may be a website or web application that the client uses to configure the vWAN 120 and receive information about the vWAN 120. The vWAN portal 114 may present a representation of the vWAN 120. For instance, the representation of the vWAN 120 may include virtual routing nodes 130. The virtual routing nodes 130 may each be associated with a respective geographic region 190 (e.g., regions 190*a*-190*e*). For example, the virtual routing nodes 130 are labelled West, East, South, North, and Central, and there is a corresponding geographic region 190 for each virtual routing node 130. The geographic regions 190 may be of different sizes. For example, a geographic region 190 may be a city, a state, a region, or a country. In some implementations, a geographic region is associated with a point of presence (POP). The virtual routing nodes 130 may include ingress points, egress points, virtual hubs, and intermediary nodes. For example, the virtual routing node 130*a* may be a ingress point because the virtual routing node 130*a* is connected to the client network 110. The virtual routing nodes 130*b* and 130*c* may be considered egress points because the virtual routing nodes 130*b* and 130*c* are connected to third party services 128. A virtual hub may refer to a network entity (e.g., virtual routing node 130*e*) that hosts a service for the client network 110. An intermediary node may refer to a virtual routing node (e.g., virtual routing node 130*d*) that connects two other virtual routing nodes (e.g., virtual routing nodes 130*a* and 130*b*).

The representation of the vWAN 120 may include overlay paths 132. The overlay paths 132 (e.g., overlay paths 132*a*, 132*b*, 132*c*, and 132*d*) may represent connections between the virtual routing nodes 130. The overlay paths 132 may each include a plurality of virtual routing nodes 130 and be associated with one or more policies for a link between the virtual routing nodes 130. The policies may be configurable by the client via the vWAN portal 114. The policies may specify routing capacity and/or preferences for the link between the virtual routing nodes 130. For example, each link between the virtual routing nodes may be associated with a SLA. The policy may specify terms of the SLA. As another example, the policy for each link between the virtual routing nodes may include one or more of a bandwidth policy, a latency policy, or a geographic policy.

In an aspect, the vWAN portal 114 allows the client to set a configuration and/or policies for the overlay paths 132. In some implementations, the configuration and/or policies may include match action rules that apply actions to traffic matching various criteria. For example, the network operator may host a service on the virtual routing node 130*e* and/or want to provide user devices 104 with access to a 3$^{rd}$ party service 128 connected to the virtual routing node 130*b* or 130*c*. The client may configure the virtual routing node 130*a* as an ingress point and specify a routing configuration for the virtual routing node 130*a* by establishing an overlay path 132*a*. The client may also configure a policy of the overlay path 132*a* to provide a desired level of service for traffic between the routing node 130*a* and the routing node 130*b*.

The vWAN 120 may be implemented by an underlying WAN 150. In the underlying WAN 150, physical resources may be located within each geographic region 190 corresponding to a virtual routing node 130. For example, the geographic region 190*a* associated with virtual routing node 130*a* may include physical resources 160*a*, 160*b*, and 160*c*, the geographic region 190*b* associated with virtual routing node 130*b* may include physical resources 162*a* and 162*b*, the geographic region 190*c* associated with virtual routing node 130*c* may include physical resources 164*a* and 164*b*, the geographic region 190*d* associated with virtual routing node 130*d* may include physical resources 166*a*, and the geographic region 190*e* associated with virtual routing node 130*e* may include physical resources 168*a* and 168*b*.

The overlay paths 132 may represent connections between virtual routing nodes 130. The overlay paths 132 may be implemented by the underlying WAN 150 using any connections in the underlying WAN 150. For instance, in the illustrated example, the overlay path 132*a* may not correspond to a direct physical connection between any resource in the geographic region 190 associated with the virtual routing node 130*a* and any resource in the geographic region 190*b* associated with the virtual routing node 130*b*. That is, the illustrated connection 170 may not necessarily be selected for the overlay path 132, and in some cases the illustrated connection 170 may not exist. Instead, the overlay path 132*a* may represent any path from a physical resource within the geographic region 190*a* associated with the virtual routing node 130*a* to any resource in the geographic region 190*b* associated with the virtual routing node 130*b*, including resources and/or connections within the geographic regions associated with the virtual routing nodes 130*c*, 130*d*, or 130*e*.

The resources 160, 162, 164, 166, 168 may represent generic resources within the geographic regions 190. For example, the resources 160, 162, 164, 166, 168 may represent data centers including multiple servers. The resources 160, 162, 164, 166, 168 may support a scalable number of virtual routers 180. Each virtual router 180 may be implemented as a virtual machine executed on commodity processing hardware (e.g., servers). The virtual routers 180 may be configured to process packets without context switches between a kernel space and a user space. For example, the virtual routers 180 may be configured with at least one of data plane development kit (DPDK), xpress transport protocol (XTP), eXpress DataPath (XDP), or another accelerated dataplane framework. Additionally, the virtual routers 180 may be configured with a tunneling mechanism that encapsulates packets using one or more encapsulation techniques or a port forwarding configuration that maps transport protocol ports on the virtual routing nodes to destination internet addresses. The virtual routers 180 may provide network path isolation between the client and other clients of the vWAN 120. That is, each virtual router 180 may be dedicated to a single client.

The virtual routers 180 allow scaling of routing capacity for the client. In some implementations, the physical connections between resources may be sufficient for a given traffic load, but performance may be constrained by routing capacity. Because the virtual routers 180 may be implemented on generic computing resource and do not require specialized routing hardware, additional virtual routers 180 may be added as needed, for example, based on client requests and/or measured traffic load. Conversely, the number of virtual routers 180 may be scaled down if the measured traffic load decreases. In an implementation, a network state component 148 may detect traffic for a client on the overlay paths 132 and trigger scaling of the virtual routers 180. For example, the network state component 148 may determine one or more links where the amount of traffic is approaching an allocated routing capacity for the number of virtual routers 180. The resource allocation component 144 may allocate additional resources and the scaling component 148 may scale the virtual routers 180.

FIG. 2 is a diagram 200 of configuration of policies 210 for overlay paths 132 in a portion of the vWAN 120. In an aspect, policies 210 for an overlay path 132 may be configured for one or more traffic classes 220. A traffic class 220 may be defined based on selection criteria. For example, the selection criteria may specify a service, a type of traffic, or a group of users. For instance, a first traffic class 220*a* may be for any user of a network service hosted at the virtual routing node 130b and a second traffic class 220b may be for a group of premium users subscribed to a 3$^{rd}$ party service connected via the virtual routing node 130b. In some implementations, the traffic class 220 may correspond to a 5-tuple (e.g., a protocol, source IP address, source port, destination IP address, destination port) or discriminated services code point (DSCP) that identifies packets for the traffic class 220. In an aspect, the vWAN portal 114 provides a user interface for configuring the policies 210. For instance, a client may select a representation of the overlay path 132a to see a list of traffic classes and applicable policies for the overlay path 132a.

In an aspect, a policy 210 may be associated with a SLA 222. The SLA 222 may be an agreement between an operator of the vWAN 120 and the client to provide services such as communication of traffic via the underlying WAN 150. The path orchestration component 140 may allow specification of SLAs at finer granularity (e.g., policies for specific overlay paths), and also provide automatic enforcement of the policies 210, and monitoring for the client. For example, the policies 210 may allow specification of a routing bandwidth 224, a bandwidth policy 226, a latency policy 228, and a geographic policy 230.

The routing bandwidth 224 may be a minimum routing bandwidth to be provided for the overlay path 132. In an implementation, the resource allocation component 144 may allocate sufficient resources in each geographic region 190 along a path through the underlying WAN 150 to meet the routing bandwidth 224. For example, to implement the overlay path 132a, the resource allocation component 144 may select a path through resources 160b, 168a, and 162b. The resource allocation component 144 may instantiate a plurality of virtual routers 180 to meet the routing bandwidth 224 at each of the resources 160b, 168a, and 162b.

The bandwidth policy 226 may specify dynamic changes in routing bandwidth for an overlay path 132. For example, the bandwidth policy 226 may specify a threshold percentage of routing bandwidth before scaling the virtual routers for an overlay path 132. For instance, the bandwidth policy 226 may specify to scale up the virtual routers 180 when the traffic level reaches 80% of the allocated routing bandwidth and scale down the virtual routers 180 when the traffic level reaches 50% of the allocated routing bandwidth. As another example, the bandwidth policy 226 may specify a maximum routing capacity for an overlay path 132. For instance, the bandwidth policy 226 may specify a maximum number of virtual routers 180 for an overlay path 132.

A latency policy 228 may specify a latency for the overlay path 132. The path orchestration component 140 may have multiple potential paths for implementing an overlay path 132. The latency for an overlay path 132 may be a total of routing latency and transmission latency for each hop on the path through the underlying WAN 150. The orchestration component 140 may provide different expected latencies by selecting paths with differing numbers of hops or latencies expected for each hop. For example, if the latency policy 228 indicates a lower latency for traffic class 220 than for traffic class 220b, the path orchestration component 140 may route traffic for traffic class 220a via connection 170 and route traffic for traffic class 220b via the connection to resources 168a.

A geographic policy 230 may specify geographic regions for a traffic class. For example, a geographic policy 230 may specify one or more geographic regions where traffic for the traffic class is restricted. For example, the geographic policy 230 may specify that traffic is not to enter geographic region 190e, for example, because geographic region 190e does not have regulations protecting data privacy. The path orchestration component 140 may account for the geographic policy 230 when selecting the path through the underlying WAN 150. In some cases, a geographic policy 230 may limit other policies such as a latency policy 228 (e.g., when the geographic region 190e provides the shorted path). The vWAN portal 114 may limit the policies that a client may select based on other selected policies for an overlay path 132.

FIG. 3 is a schematic diagram of an example of an apparatus 300 (e.g., a computing device) for routing traffic in a public cloud network. The apparatus 300 may be implemented as one or more computing devices in the underlying WAN 150.

In an example, apparatus 300 can include a processor 302 and/or memory 304 configured to execute or store instructions or other parameters related to providing an operating system 306, which can execute one or more applications or processes, such as, but not limited to, the path orchestration component 140. For example, processor 302 and memory 304 may be separate components communicatively coupled by a bus (e.g., on a motherboard or other portion of a computing device, on an integrated circuit, such as a system on a chip (SoC), etc.), components integrated within one another (e.g., processor 302 can include the memory 304 as an on-board component), and/or the like. Memory 304 may store instructions, parameters, data structures, etc. for use/execution by processor 302 to perform functions described herein.

In an example, the path orchestration component 140 may include the configuration component 142, the resource allocation component 144, the scaling component 146, and the network state component 148.

FIG. 4 is a flow diagram of an example of a method 400 for routing traffic in a public cloud network. For example, the method 400 can be performed by the apparatus 300 and/or one or more components thereof to implement overlay paths of a vWAN 120 on an underlying WAN 150.

At block 410, the method 400 includes receiving a configuration of a set of overlay paths for a wide area network virtualization from a client, each overlay path including virtual routing nodes associated with respective geographic regions and at least one policy for a link between the virtual routing nodes. In an example, the configuration component 142, e.g., in conjunction with processor 302, memory 304, and operating system 306, can receive a configuration of a set of overlay paths 132 for a wide area network virtualization (e.g., vWAN 120) from a client. Each overlay path 132 includes virtual routing nodes 130 associated with respective geographic regions 190 and at least one policy 210 for a link between the virtual routing nodes.

At block 420, the method 400 includes instantiating a plurality of virtual routers on computing resources of the public cloud network located within the respective geographic regions based on the configuration, each virtual router configured to route traffic according to the policy for each link associated with the virtual routing node corresponding to the virtual router. In an example, the path orchestration component 140 and/or the resource allocation component 144, e.g., in conjunction with processor 302, memory 304, and operating system 306, can instantiate the plurality of virtual routers 180 on computing resources (e.g., 160, 162, 164, 166, 168) of the public cloud network (e.g., underlying WAN 150) located within the respective geographic regions 190 based on the configuration. Each virtual router 180 is configured to route traffic according to the policy 210 for each link associated with the virtual routing node 130 corresponding to the virtual router 180. For example, at sub-block 422, the resource allocation component 144 may configure the plurality of virtual routers 180 with a tunneling mechanism that encapsulates packets using one or more encapsulation techniques or a port forwarding configuration that maps transport protocol ports on the virtual routing nodes 130 to destination internet addresses (e.g., of the other resources in the geographic region 190 corresponding to the destination virtual routing node 130).

At block 430, the method 400 includes scaling the plurality of virtual routers based on traffic for the client on the set of overlay paths. In an example, the path orchestration component 140 and/or the scaling component 146, e.g., in conjunction with processor 302, memory 304, and operating system 306, can scale the plurality of virtual routers 180 based on traffic for the client on the set of overlay paths 132. For example, at sub-block 434, the block 430 may include adjusting a number of the virtual routers 180 within a range defined by the client. For instance, the range may be defined by the routing bandwidth 224 and/or the bandwidth policy 226. As another example, at sub-block 436, the block 430 may include receiving a request from the client to add or remove a virtual router 180.

Figure 5:
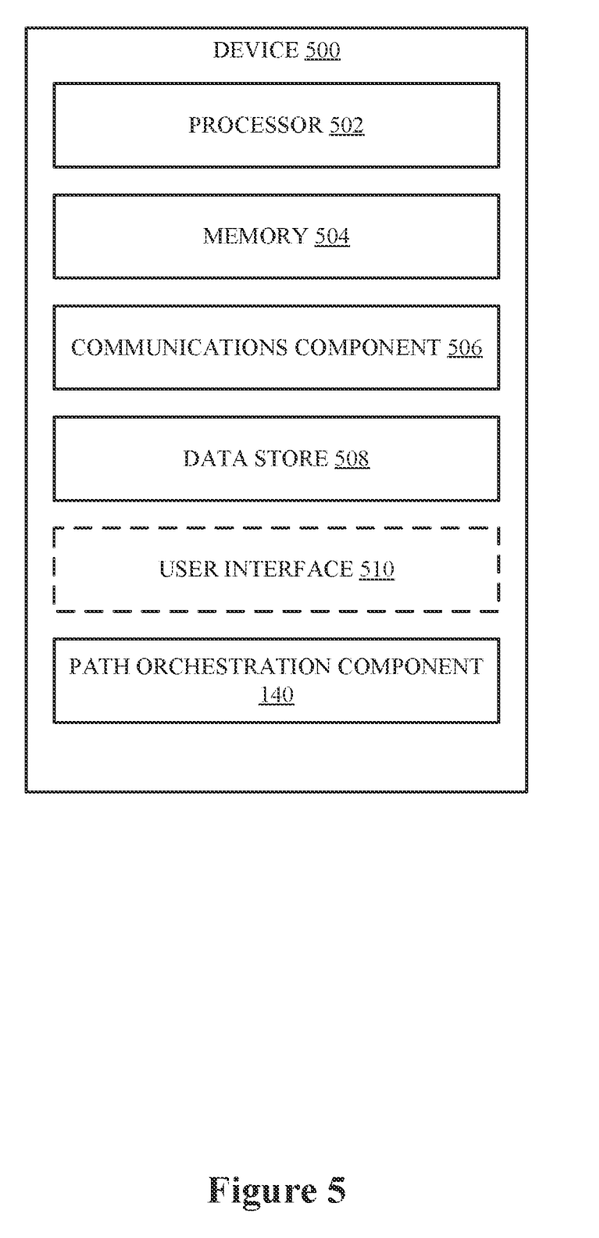
FIG. 5 is a schematic diagram of an example of a device for performing functions of a path orchestration component described herein, in accordance with aspects described herein.

FIG. 5 illustrates an example of a device 500 including additional optional component details as those shown in FIG. 3. In one aspect, device 500 may include processor 502, which may be similar to processor 302 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 304 such as for storing local versions of operating systems (or components thereof) and/or applications being executed by processor 502, such as the path orchestration component 140, the configuration component 142, the resource allocation component 144, the scaling component 146, the network state component 148, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc. not currently being executed by processor 502. In addition, data store 508 may be a data repository for the path orchestration component 140.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include a path orchestration component 140 for routing traffic for an overlay path on an underlying WAN, a configuration component 142 for receiving a configuration of a set of overlay paths for a wide area network virtualization from a client, a resource allocation component 144 for instantiating a plurality of virtual routers on computing resources of the public cloud network located within the respective geographic regions based on the configuration, a scaling component 146 for scaling the plurality of virtual routers based on traffic for the client on the set of overlay paths, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for configuring traffic routing in a public cloud network, comprising:
    a memory storing computer-executable instructions; and
    at least one processor configured to execute the computer-executable instructions to:
        receive a configuration of a set of overlay paths for a wide area network virtualization from a client, each overlay path including virtual routing nodes associated with respective geographic regions and at least one policy for a link between the virtual routing nodes;
        instantiate a plurality of virtual routers on computing resources of the public cloud network located within the respective geographic regions based on the configuration, each virtual router of the plurality of virtual routers is configured to route traffic according to the at least one policy for each link associated with the virtual routing node corresponding to the virtual router; and
        scale the plurality of virtual routers based on traffic for the client on the set of overlay paths.

2. The apparatus of claim 1, wherein the virtual routing nodes include ingress points, egress points, virtual hubs, and intermediary nodes.

3. The apparatus of claim 1, wherein each virtual router of the plurality of virtual routers is configured to process packets without context switches between a kernel space and a user space.

4. The apparatus of claim 3, wherein each of the plurality of virtual routers is configured with at least one of data plane development kit (DPDK), xpress transport protocol (XTP), eXpress DataPath (XDP), or another accelerated dataplane framework.

5. The apparatus of claim 1, wherein the at least one processor is configured to instantiate the plurality of virtual routers with a tunneling mechanism that encapsulates packets using one or more encapsulation techniques or a port forwarding configuration that maps transport protocol ports on the virtual routing nodes to destination internet addresses.

6. The apparatus of claim 1, wherein the plurality of virtual routers provide network path isolation between the client and other clients of the public cloud network.

7. The apparatus of claim 1, wherein the plurality of virtual routers includes virtual machines executed on generic processing resources of the computing resources.

8. The apparatus of claim 1, wherein the at least one policy for each link between the virtual routing nodes is associated with a service level agreement (SLA).

9. The apparatus of claim 1, wherein the at least one policy for each link between the virtual routing nodes includes one or more of a bandwidth policy, a latency policy, or a geographic policy.

10. The apparatus of claim 1, wherein the at least one processor is configured to adjust a number of the virtual routers within a range defined by the client.

11. The apparatus of claim 1, wherein the at least one processor is configured to receive a request from the client to add a new virtual router to the plurality of virtual routers or remove one virtual router of the plurality of virtual routers from the plurality of virtual routers.

12. The apparatus of claim 1, wherein each overlay path is associated with a 5-tuple or discriminated services code point (DSCP) that identifies client traffic for the overlay path.

13. The apparatus of claim 1, wherein the configuration of the overlay path includes a routing bandwidth for one or more of the virtual routing nodes or one or more of the links between the virtual routing nodes.

14. A method of routing traffic in a public cloud network, comprising:
    receiving a configuration of a set of overlay paths for a wide area network virtualization from a client, each overlay path including virtual routing nodes associated with respective geographic regions and at least one policy for a link between the virtual routing nodes;
    instantiating a plurality of virtual routers on computing resources of the public cloud network located within the respective geographic regions based on the configuration, each virtual router of the plurality of virtual routers is configured to route traffic according to the at least one policy for each link associated with the virtual routing node corresponding to the virtual router; and
    scaling the plurality of virtual routers based on traffic for the client on the set of overlay paths.

15. The method of claim 14, wherein the virtual routing nodes include ingress points, egress points, virtual hubs, and intermediary nodes.

16. The method of claim 14, wherein each virtual router of the plurality of virtual routers is configured to process packets without context switches between a kernel space and a user space.

17. The method of claim 14, wherein instantiating the plurality of virtual routers on computing resources of the public cloud network located within the respective geographic regions based on the configuration comprises configuring the plurality of virtual routers with a tunneling mechanism that encapsulates packets using one or more encapsulation techniques or a port forwarding configuration that maps transport protocol ports on the virtual routing nodes to destination internet addresses.

18. The method of claim 14, wherein the plurality of virtual routers provide network path isolation between the client and other clients of the public cloud network.

19. The method of claim 14, wherein scaling the plurality of virtual routers based on traffic for the client on the set of overlay paths comprises adjusting a number of the virtual routers within a range defined by the client.

20. The method of claim 14, wherein scaling the plurality of virtual routers based on traffic for the client on the set of overlay paths comprises receiving a request from the client to add a new virtual router to the plurality of virtual routers or remove one virtual router of the plurality of virtual routers from the plurality of virtual routers.

\* \* \* \* \*